SEMICONDUCTOR LEAKAGE DETECTOR AND CONTROL CIRCUIT

Filed Oct. 12, 1964

INVENTOR.
CEDRIC G. CURRIN
BY
Howard W. Hermann
ATTORNEY

United States Patent Office 3,312,862
Patented Apr. 4, 1967

3,312,862
SEMICONDUCTOR LEAKAGE DETECTOR AND CONTROL CIRCUIT

Cedric G. Currin, Midland, Mich., assignor to Dow Corning Corporation, Midland, Mich., a corporation of Michigan Filed Oct. 12, 1964, Ser. No. 403,411
2 Claims. (Cl. 317—10)

Figure 1:
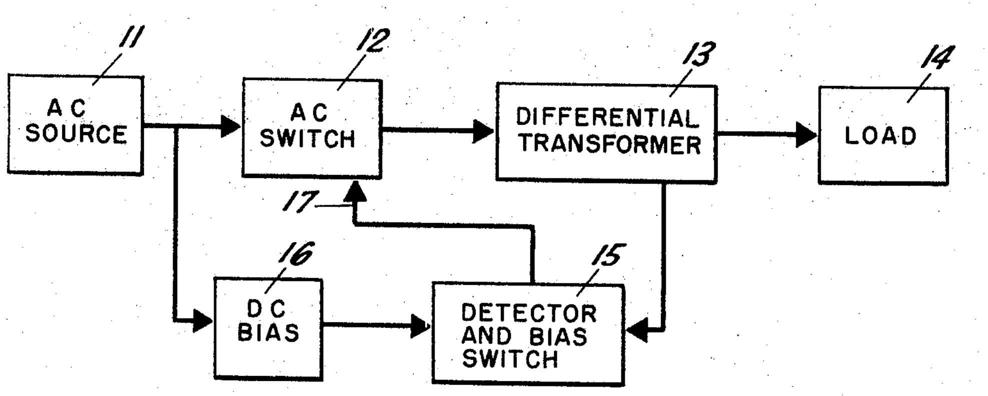

The present invention relates to leakage detector circuits, and more particularly, to circuits wherein power is switched off in response to detection of leakage.

In swimming pool lighting it is a common practice to provide underwater illumination by electrically energized lamps located beneath the surface of the water. Under such conditions it is possible for leakage to cause a hazard to users of the pool. To alleviate this danger a number of lighting control circuits have been proposed, but none have been entirely satisfactory. Some were too complicated and/or expensive, and often were rather elaborate. Others were not positive in their operation and therefore failed in their purpose.

A need continues to exist for a relatively uncomplicated and inexpensive circuit which will positively control voltage applied to swimming pool lighting. This need constitutes a primary object of the present invention.

A further object is the provision of a leakage detector circuit, which in response to a signal indicating a leakage, automatically removes the electrical energy being applied to the load.

In accordance with these and other objects there is provided by the present invention a circuit in which a detector, which may be a differential transformer, or the like, is utilized to detect unbalance in the load supply leads. Such an unbalance indicates leakage to ground and a voltage is produced by the detector and supplied to the gate of a semiconductive switch or gating device, which in turn, causes a second switch to open the line which provides power to the load.

This circuit, although designed for swimming pool lighting, obviously may be used for leakage detection and control in other types of systems.

Other objects and many of the attendant advantages of this invention will become obvious to those skilled in the art by a consideration of the following detailed description when read in conjunction with the accompanying drawings wherein like reference characters designate like or corresponding parts throughout the several figures thereof, and wherein.

Figure 2:
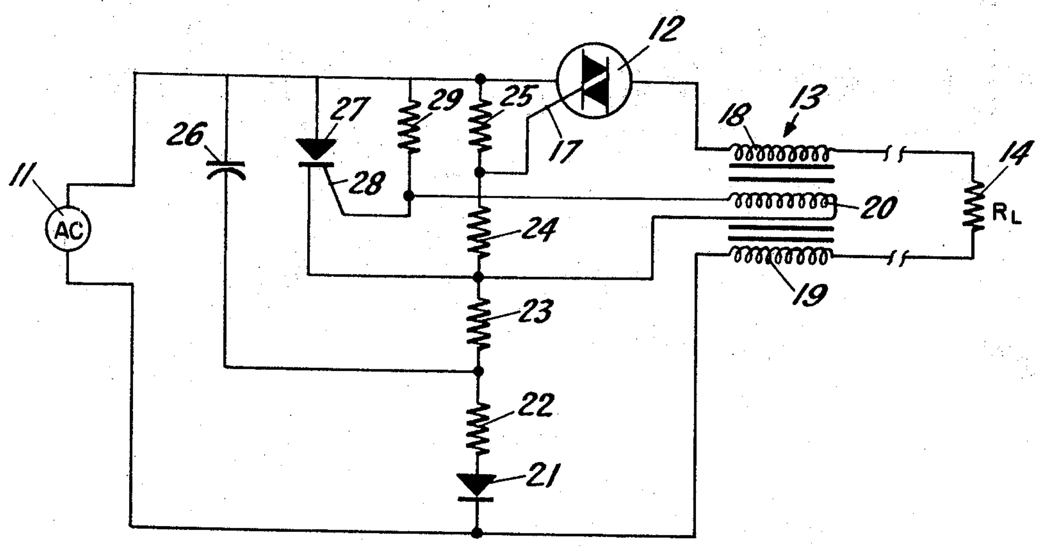

FIG. 1 is a block diagram of a circuit built in accordance with the present invention; and FIG. 2 is a schematic circuit diagram of a specific circuit of the type covered by the block diagram of FIG. 1.

Referring now to the drawings there is shown in FIG. 1 an alternating current source 11, which is connected through a switch 12 and a differential transformer 13 to a load 14. Assuming the switch 12 is closed there is a completed circuit from the source 11 through the transformer 13 to the load 14. With all power through the transformer being supplied to the load the transformer coils tied through the load will have equal currents. If, however, a current leakage to ground were to occur in the load circuit, the differential transformer would detect an unbalance in the two coils and would provide an output to a current detector and bias switch 15. The current detector and bias switch 15 controls the gate of the switch 12. A direct current bias voltage source 16 also feeds into the current detector and bias switch 15.

Under normal conditions the direct current bias s fed to the control terminal or gate 17 of the alternating current switch 12, thereby keeping the switch in a conducting or on condition. If, however, an unbalance is detected in the differential transformer 13, the current detector and bias switch 15 removes the bias potential from the gate 17 and the switch 12 becomes non-conduting thereby disconnecting the load circuit.

In FIG. 2, there is shown a schematic diagram of a circuit which fulfills the functions of the block diagram of FIG. 1, and in which corresponding parts are given like reference numerals insofar as practicable. As in FIG. 1, the circuit of FIG. 2 shows an A.C. source 11 connected to a load 14 indicated as a resistor $R_L$, but which may include inductive and/or capacitive elements without impairing the function of the circuit. Between the power source 11, and the load 14 are an A.C. switch 12 and a differential transformer 13, which has two coils 18 and 19 connected in series with the load on opposite sides thereof, and a detector coil 20 interposed between the two coils 18 and 19 to detect any imbalance of current flowing in the two coils.

The A.C. switch 12 is of the type wherein a D.C. control bias voltage is necessary to keep the switch in closed or conducting condition and which automatically switches off (opens the circuit) in the event the D.C. bias is removed. One type of device found to be suitable for this purpose is the Triac ZJ–257 sold by the General Electric Company, and described in GE Application Note 200.35, 2/64 Preliminary. This device is a multiple junction semiconductor having two main terminals and a gate terminal, and wherein conduction is maintained only while sufficient voltage is applied at the gate terminal. The gate terminal is designated by the numeral 17 of FIG. 2.

To provide and maintain a D.C. bias voltage on the gate 17 of switch 12 there is connected across the source a rectifying diode 21 in series with a resistive voltage dividing network comprising series connected resistors 22, 23, 24, and 25. A capacitor 26 is provided between the A.C. source and the juncture of resistors 22 and 23 to maintain the D.C. bias during the nonconductive half cycles of the diode 21 and the switch gate 17 is connected to the juncture of resistors 24 and 25.

A silicon controlled rectifier or thyristor 27 is connected between the A.C. source and the juncture of resistors 23 and 24, and has the same polarity as the diode 21. The imbalance detector coil 20 of the differential transformer 13 is connected between the control terminal 28 and the cathode of the signal controlled rectifier 27.

Assuming a no-signal condition in the detector coil 20 of the transformer, i.e. no leakage and therefore equal current in coils 18 and 19, there is no voltage differential between the gate 28 and the cathode of the controlled rectifier 27, and the rectifier remains in a nonconducting state. If, however, a voltage is developed in the detector coil 20 indicating leakage in the load circuit, the voltage differential is applied between the gate and cathode of the controlled rectifier 27 and the rectifier switches on. When it does so it short circuits the bias supply of the control terminal 17 of the A.C. switch 12 and renders the switch nonconducting, thereby cutting off power to the load. As long as power from the source 11 remains, sufficient current will flow through the controlled rectifier 27 for it to remain conducting even though no signal is generated by the differential transformer 13 after switch 12 opens.

If desired, a relatively high resistance 29 may be connected between the gate 28 of the controlled rectifier 27 and the A.C. source 11. In the event that the transformer opens, a potential difference will be applied between the gate and the cathode of the controlled rectifier 27 causing the rectifier to trigger and thereby shorting out the bias potential to the switch 12, and rendering the switch nonconductive. This is a safety feature for preventing damage to the circuit.

In a practical circuit the components of the circuit were of the following types:

| | |
|---|---|
| Capacitor **26** | 35 μfd. |
| Diode **21** | 1N602. |
| Resistor **29** | 1800 ohms. |
| Resistors **23, 24, 25** | 270 ohms each. |
| Resistor **22** | 500 ohms. |
| Switch **12** | (GE) ZJ-285. |
| Controlled rectifier **27** | (Motorola) MCR 914-1. |

Obviously, many modifications and variations of the present invention will become obvious to those skilled in the art. Accordingly, it is to be understood that within the scope of the appended claims the invention may be practiced, otherwise than as specifically described.

That which is claimed is:

1. A control circuit for interconnection between an alternating current source and a load, said circuit being responsive to current leakage in the vicinity of the load, comprising:

a differential transformer for detecting current differential between the leads supplying said load, two windings of said transformer being connected in series with said load at opposite sides of the load, and having an output winding arranged to detect differences in current flowing between said two windings, a D.C. bias voltage controlled, gated, semiconductor alternating current switch having an input terminal connected to said source and an output terminal connected to one winding of said differential transformer, said switch having a characteristic whereby unless bias voltage is applied to its gate terminal the device is non-conductive, a D.C. bias voltage supply connected to the gate of said switch, a controlled rectifier connected between the gate terminal and the input terminal of said switch, said controlled rectifier having its control terminal connected to the output winding of said differential transformer, whereby a signal produced by said differential transformer causes conduction by said controlled rectifier.

2. A control circuit as defined in claim 1 and further including a resistive element interconnecting the gate of said controlled rectifier and the input terminal of said switch to provide bias potential to the control terminal of said controlled rectifier in the event said transformer opens.

References Cited by the Examiner

UNITED STATES PATENTS

| | | | |
|---|---|---|---|
| 3,155,879 | 11/1964 | Casey et al. | 317—33 X |
| 3,213,321 | 10/1965 | Dalziel | 317—18 |
| 3,252,052 | 5/1966 | Nash | 317—18 |

MILTON O. HIRSHFIELD, *Primary Examiner.*

R. V. LUPO, *Assistant Examiner.*